J. F. HAFFEY.
MOLASSES JUG AND OTHER HINGED LID RECEPTACLE.
APPLICATION FILED JAN. 18, 1909.
952,428.
Patented Mar. 15, 1910.
2 SHEETS—SHEET 1.
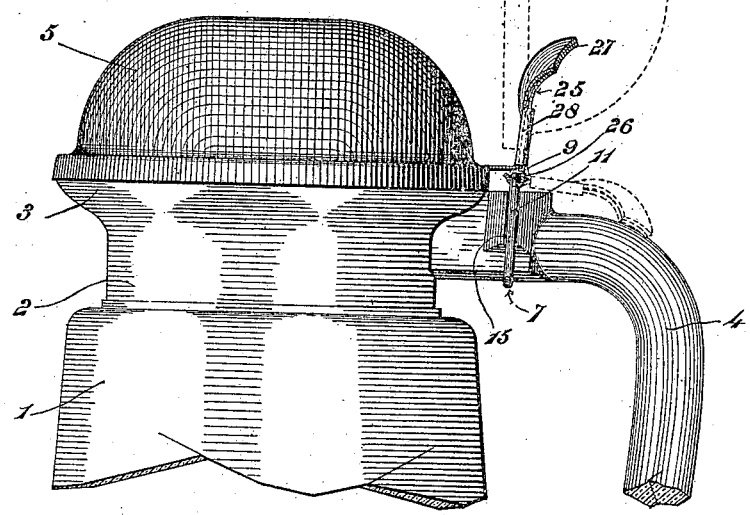
Fig. I.
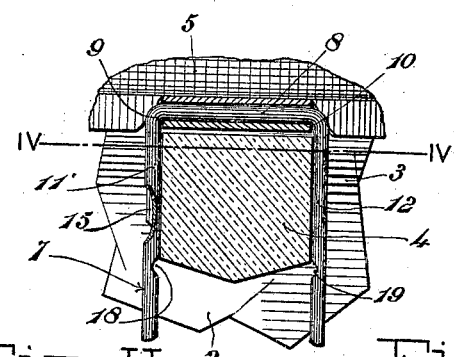
Fig. II.
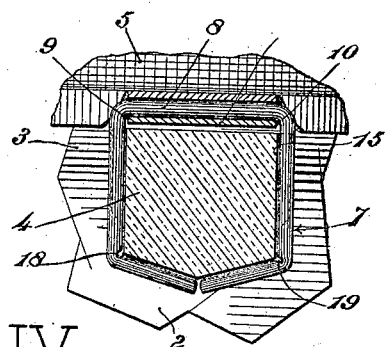
Fig. III.
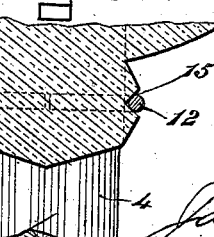
Fig. IV.
WITNESSES
Harry King
M. H. Gates
INVENTOR:
James F. Haffey
By Joseph Atkins,
Attorney.

J. F. HAFFEY.
MOLASSES JUG AND OTHER HINGED LID RECEPTACLE.
APPLICATION FILED JAN. 18, 1909.
952,428.
Patented Mar. 15, 1910.
2 SHEETS—SHEET 2.
Fig. V.
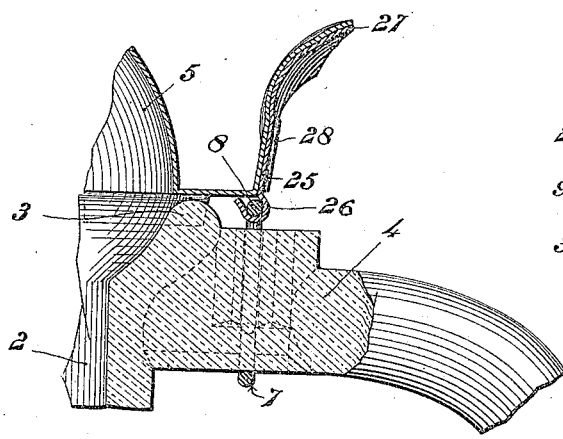
Fig. VI.
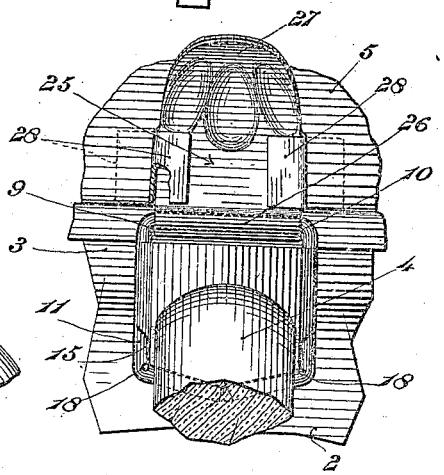
Fig. VII.
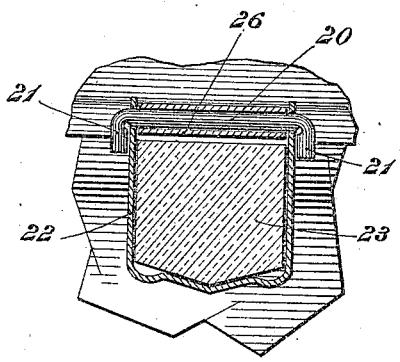
Fig. VIII.
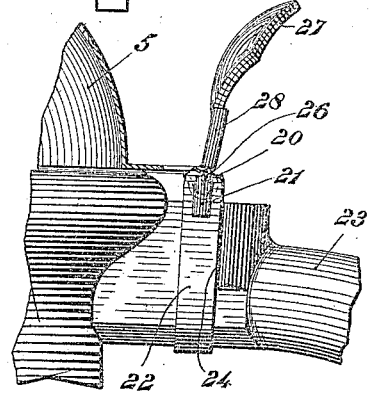
WITNESSES
INVENTOR:

UNITED STATES PATENT OFFICE.

JAMES F. HAFFEY, OF TIFFIN, OHIO, ASSIGNOR TO CHARLES S. BARON, OF TIFFIN, OHIO.

MOLASSES-JUG AND OTHER HINGED-LID RECEPTACLE.

952,428.  Specification of Letters Patent.  Patented Mar. 15, 1910.

Application filed January 18, 1909. Serial No. 472,943.

*To all whom it may concern:*

Be it known that I, JAMES F. HAFFEY, of Tiffin, in the county of Seneca, State of Ohio, have invented certain new and useful Improvements in Molasses-Jugs and other Hinged-Lid Receptacles, of which the following is a specification.

The object of my invention is to produce improved means for flexibly uniting a lid to a molasses jug or other receptacle without the use of solder, plaster, or cement, and without the employment of metallic or other fittings about the neck of the jug or receptacle.

By the aid of my invention I am enabled to unite a lid to a jug by a strong and durable hinge, and by means which, unobtrusive in appearance and pleasing to the eye, are likewise secure, and which lend themselves to sanitary requirements by the facility and thoroughness with which the jug may be washed and thoroughly cleansed.

In the accompanying drawing, which constitutes a part of this specification, Figure I is a side elevation of my invention as applied to a molasses jug, showing, in full lines, the lid in the closed position, and in dotted lines, the lid raised. Fig. II is a detail vertical section taken through the jug handle and showing the elongated pintle-piece in engagement therewith and before it is bent. Fig. III is a view similar to Fig. II showing the manner in which the pintle-piece is bent to engage the jug handle. Fig. IV is a horizontal section on the line IV—IV of Fig. II showing the relative conformation of the jug handle and pintle-piece. Fig. V is a detail vertical section taken at right angles to the section shown in Fig. II, and illustrating the relationship subsisting between the tail-piece, knuckle-piece, pintle-piece, and jug handle. Fig. VI is a rear elevation of a portion of the subject matter of Fig. I, showing, in full lines, the complete device with the lugs upon the tail-piece bent into retentive engagement with the knuckle-piece, and, in dotted lines, said lugs before they are bent. Fig. VII is a view similar to Fig. III, showing a modification of my device. Fig. VIII is a detail, side elevation illustrative of the modification shown in Fig. VII.

Referring to the numerals on the drawing, 1 indicates a receptacle which is shown by way of illustration only as a molasses jug. It is provided with a neck 2, lip 3, and handle 4, all preferably made integral with each other and of any suitable material, the usual material of molasses jugs being glass.

It has been stated as one of the objects of my invention to provide means for securing a lid, indicated in the drawing by the numeral 5, to a jug without the aid of metallic members about the neck or mouth of the jug. To this end, I prefer to unite the lid to a laterally projecting member, represented in the drawing by the handle 4, the upper part of which is utilized as the member to which the lid is directly united.

The lid may be of any suitable material, and the means which I prefer to employ for uniting it to the jug is a metallic member 7, which is flexibly united or hinged to the lid by suitable or preferred means, and is securely fastened to the jug, preferably by direct engagement with the handle 4 thereof.

I prefer to make the member 7 a pintle-piece, so called for the reason that it consists of or comprehends as a part of it a pintle 8. The pintle-piece preferably consists of a piece of stiff wire bent at the points 9 and 10, which define the length of the pintle between them, and extending therefrom in parallel legs 11 and 12. These legs are adapted to enter vertical grooves 15 formed in the opposite sides of a member projecting from the neck 2, or substantially as shown in the drawing, in the opposite sides of the handle 4.

The length of the legs 11 and 12 is so far greater than the vertical width of the handle 4 as to permit of the bending of the legs underneath the handle for securing the engagement of the pintle-piece with the handle. In view of the fact that my invention is applicable generally to receptacles of a fragile nature, I prefer to provide the legs 11 and 12 respectively, with weakening indentations 18 and 19, located at the point at which they are to be bent underneath the handle 4, whereby the location of the bend is accurately determined and the bending operation facilitated without danger of breaking the receptacle. By this means, a strong and sufficiently massive pintle-piece is secured to make a good hinge in connection with readily flexible means for securing the pintle-piece to the handle.

Instead of the extension of the pintle-piece into legs of such extent as will admit of their being bent about the handle 4 and into engagement with it, I may employ a short pintle-piece 20, as shown in Figs. VII and VIII, which, as by short terminal bends 21, may be secured to a strap 22 that with the pintle-piece 20 encircles the handle 23, corresponding to the handle 4, and engages grooves 24 therein, just as the legs 11 and 12 engage the grooves 15 in the handle 4. The modification under consideration is entirely feasible in service, but the preferred construction of the pintle-piece is as previously described.

The pintle-piece 7, or its equivalent shown in Figs. VII and VIII, is useful as a means for flexibly uniting any lid to its receptacle, but my invention extends to a form of metal lid and its connection with its pintle 8 or pintle-piece 20. In that connection, I use a knuckle-piece 25, which, comprising a knuckle 26 and a strap end 27 fitted to the tail-piece of the lid 5, is adapted to be firmly secured to the tail-piece without the use of solder as by engagement with the strap, when the tail-piece and strap are assembled, by lugs 28 projecting laterally from the tail-piece. These lugs are struck out of the piece of which the lid and tail-piece are made, and project upon opposite sides of the tail-piece, as shown in Fig. VI. After bending the lugs about the strap and against the face thereof, they serve to securely unite the parts without the use of solder, and to afford through the presence of the knuckle carried upon the strap a suitable hinge connection to be utilized with the pintle for uniting the receptacle and its lid.

What I claim is:

The combination of the lid having a tail-piece provided with lugs, a knuckle piece comprising a knuckle and strap end, the strap end held by the lugs of the tail-piece, a receptacle having a laterally projecting member in the upper end of which and on opposite sides are vertical grooves and a metallic member resting in the vertical grooves and the knuckle.

In testimony whereof I have hereunto signed my name in the presence of two subscribing witnesses.

JAMES F. HAFFEY.

Witnesses:
MILTON SAYLER,
NORMAN W. PETERS.